United States Patent
Hermanns et al.

(10) Patent No.: US 9,223,549 B1
(45) Date of Patent: Dec. 29, 2015

(54) USER INTERFACE GENERATION USING A MODEL LAYER

(71) Applicants: Marcel Hermanns, Heidelberg (DE); Cristina Buchholz, Reilingen (DE)

(72) Inventors: Marcel Hermanns, Heidelberg (DE); Cristina Buchholz, Reilingen (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 14/320,274

(22) Filed: Jun. 30, 2014

(51) Int. Cl.
*G06F 9/44* (2006.01)
*G06F 3/048* (2013.01)

(52) U.S. Cl.
CPC .............. *G06F 8/38* (2013.01); *G06F 9/4443* (2013.01); *G06F 3/048* (2013.01)

(58) Field of Classification Search
None
See application file for complete search history.

(56) References Cited

U.S. PATENT DOCUMENTS

| | | | |
|---|---|---|---|
| 8,239,882 B2 * | 8/2012 | Dhanjal et al. | 719/319 |
| 2001/0049595 A1 * | 12/2001 | Plumer et al. | 703/22 |
| 2004/0046789 A1 | 3/2004 | Inanoria | |
| 2006/0026519 A1 * | 2/2006 | Vaindiner et al. | 715/700 |
| 2006/0179065 A1 * | 8/2006 | Xu | 707/100 |
| 2007/0050710 A1 * | 3/2007 | Redekop | 715/523 |
| 2009/0198649 A1 * | 8/2009 | Vaughan et al. | 707/3 |
| 2009/0300060 A1 * | 12/2009 | Beringer et al. | 707/103 R |
| 2010/0161682 A1 * | 6/2010 | Pfeifer et al. | 707/803 |
| 2010/0251129 A1 * | 9/2010 | Beringer et al. | 715/738 |
| 2010/0251133 A1 * | 9/2010 | Beringer et al. | 715/744 |
| 2012/0054262 A1 * | 3/2012 | Demant et al. | 709/203 |
| 2013/0144918 A1 * | 6/2013 | Said et al. | 707/803 |
| 2013/0145348 A1 * | 6/2013 | Agovic et al. | 717/120 |
| 2013/0159909 A1 * | 6/2013 | Kornmann et al. | 715/771 |
| 2013/0326464 A1 * | 12/2013 | Hermanns et al. | 717/100 |
| 2014/0181788 A1 * | 6/2014 | Sullivan et al. | 717/109 |

OTHER PUBLICATIONS

European Communication for EPC Application No. 15001807.5, 9 pages, mailed Oct. 26, 2015.
Pinheiro da Silva, Paulo, "User Interface Declarative Models and Development Environments: A Survey", Security in Communication Networks, Third International Conference, vol. 1946, pp. 207-226 (2002).

* cited by examiner

*Primary Examiner* — Isaac T Tecklu
(74) *Attorney, Agent, or Firm* — Klarquist Sparkman, LLP

(57) ABSTRACT

Systems and methods are disclosed for developing a user interface. The method may include receiving a software development framework-independent data processing application of a consumption layer. A software development framework type may be received out of a plurality of supported software development framework types of a model layer. A plurality of object models adhering to the selected software development framework type may be displayed. A particular object model out of the plurality of object models may be received. A plurality of elements from the particular object model may be displayed for incorporation into the user interface. A selection of elements out of the plurality of elements may be received. The user interface may be generated, where the generating includes incorporating the selected elements for the software development framework-independent data processing application according to the particular object model of the selected software development framework type.

20 Claims, 10 Drawing Sheets

USER INTERFACE GENERATION USING A MODEL LAYER

BACKGROUND

As enterprises accumulate ever-greater amounts of data on their transactions, processes, products, and operations, online analytical processing has become an important part of doing business. The number of tools and techniques addressing analytical processing has grown, enabling data analysts to quickly analyze and navigate through vast and complex collections of data using processing software and platforms. Processing software systems use objects to represent real-world items used during the transaction of business. For example, an object may include logic and/or structured data, and may be used to represent a document, such as a sales order, a purchase order, an invoice, a product, a partner company, or equipment. The underlying structure of the object may be determined based on the requirements of the environment in which the object is to be used. In many instances, objects, such as documents in a document flow, include data that can be used in a variety of ways to facilitate understanding of the data by users/customers of the associated analytical processes. However, such data may be spread among many documents in the document flow, and its extraction and processing may be time-consuming and challenging.

Databases and business objects are highly useful tools allowing users to manage complex relationships between large amounts of different types of data. When data is requested to be read, analyzed, and returned in a de-normalized view from a database, in general a user interface (UI), web service, data export and the like will formulate a use scenario, such as a query, search, or free search having features, to the database. The database can include a large number of instantiated business objects, entities that include attributes and associations with other business objects.

Typically, different data models and business object frameworks are implemented in a complex architecture. For example, an integration of each business model into different user interface (UI) technologies can include complex integrations with differing frameworks. Therefore, systems implemented using the UI technologies and the different business models result in different components and the point-to-point integrations. The point-to-point integrations can result in a high total cost of development (TCD) for the business object framework development, maintenance, and the integration effort for the system. Experiences for application developers can be less than ideal, because each of the different integrations have no harmonized look and feel. Again this can results in a high TCD for the developer as well as any partners and/or customers, because no common concepts, tooling and integrations are in place in the current art. As a result, a developer has to learn point to point integration. In addition, a combination of different integrations may not be possible or may require a significant amount of manual effort.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In an example aspect of the disclosure, a computer-implemented method of developing a user interface is disclosed and may include receiving a software development framework-independent data processing application of a consumption layer. A software development framework type may be received from a plurality of supported software development framework types of a model layer. A plurality of object models adhering to the selected software development framework type of the model layer may be displayed. A particular object model out of the plurality of object models may be received. A plurality of elements from the particular object model may be displayed for incorporation into the user interface. A selection of elements may be received out of the plurality of elements. The user interface may be generated, where the generating may include incorporating the selected elements for the software development framework-independent data processing application according to the particular object model of the selected software development framework type of the model layer.

In another aspect of the disclosure, a user interface (UI) configurator system may include a plurality of framework-specific object models, each object model including a plurality of elements for selection in a user interface; a framework-independent data processing application associated with a data source; and an interface processor. The interface processor may be operable to couple the framework-independent data processing application with the plurality of framework-specific object models. The plurality of object models may include at least a database dictionary model and a search model. The interface processor may be configured to display a selection of the plurality of elements for a selected object model out of the object models. In response to a selection of one or more of the plurality of displayed elements, a UI may be generated based on the selection of displayed elements. The UI may couple the data processing application to the selected object model. The UI may include a search interface associated with the selection of the plurality of elements. A preview of the UI may be displayed, where the preview of the UI is updated upon selection of a new element, and the preview of the UI is updated upon de-selection of a selected element. Upon receiving a final element selection, the UI may be stored in one or more computer-readable media for use with the data processing application.

As described herein, a variety of other features and advantages can be incorporated into the technologies as desired.

DETAILED DESCRIPTION

The technologies described herein can be used in a user interface development environment using a model layer, where the resulting UI provides an interface between a consumption layer object and one or more model layer objects. A data processing application can be developed independent of and be decoupled from a particular software development framework type. Via the technologies described herein, user interfaces incorporating elements from a variety of software development framework types can be generated for such an application. A user interface development tool can present a unified development user interface across and generic to different software development framework types.

As used herein, the terms "data" or "information content" can include analytics data, such as created analytics reports, analytics, or other artifacts created by enterprise database suites (e.g., SAP's Crystal Reports, Lumira Datasets, WEBI reports, XCelcius reports, etc.). The data or information content can also be other, arbitrary content such as spreadsheets, images, documents in a document flow, user interfaces, web services, or the like.

Figure 2:
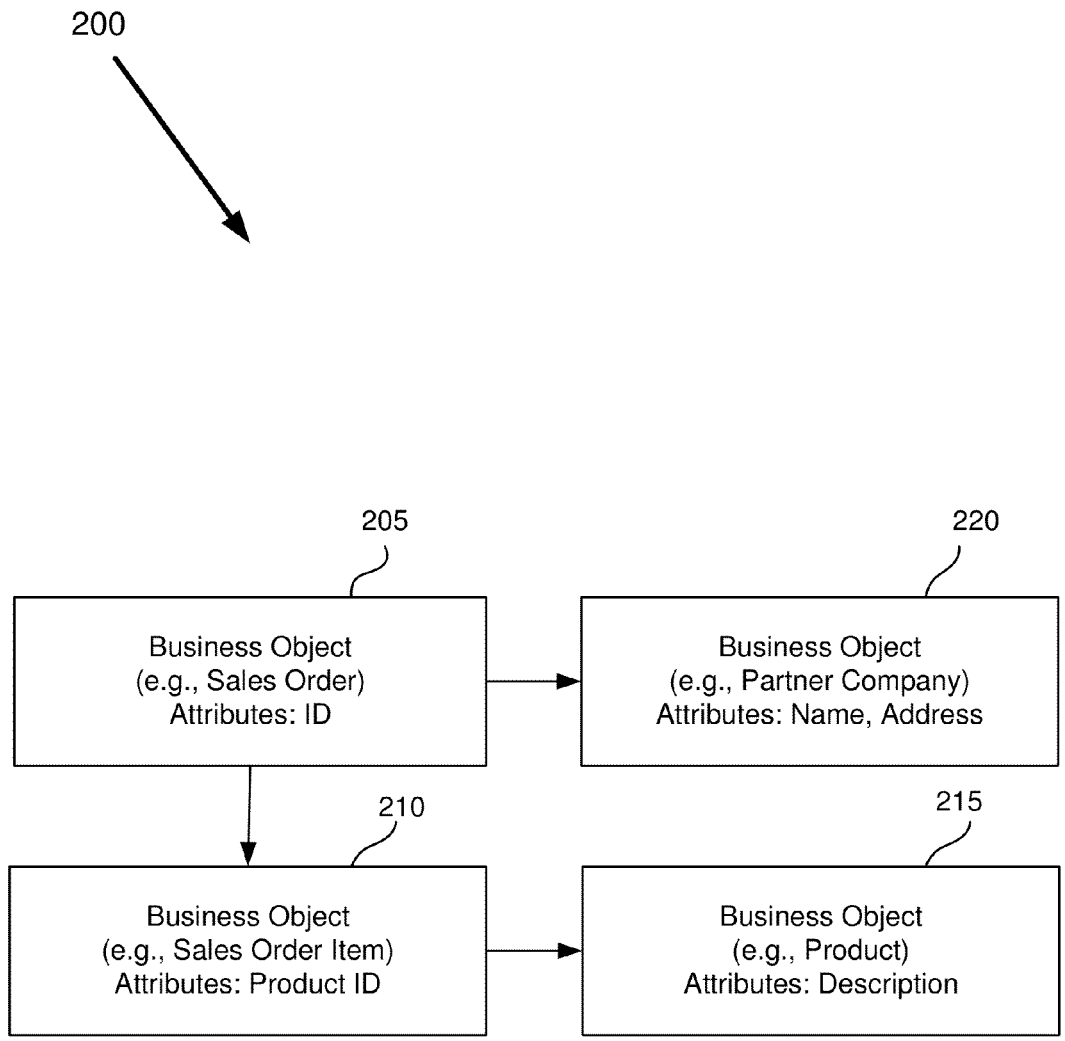
FIG. 2 is a block diagram of a business object data model, in accordance with an example embodiment of the disclosure.

As used herein, the term "object" (or "business object") may represent real-world items used during the transaction of business, such as documents (e.g., a sales order, a purchase order, an invoice, etc.), a product, a partner company, a piece of equipment, and so forth. A business object may include business logic and/or data having any suitable structure, which may be based on the requirements of the business scenario in which the business object is to be used. For example, a business object (or a user interface for rendering data for business objects, or a web service for accessing data for business objects) may include a plurality of attributes (or data), where the attributes may be associated with access paths to the locations (e.g., database locations) storing the attributes' data. Each attribute may be associated with one or more backend data processing services used for querying, retrieving and manipulating the data. As used herein, the terms "object" and "object model" are interchangeable. An example business object and associated attributes is illustrated in FIG. 2.

As used herein, the term "metadata" means data about other data, and the term "analytics metadata" can include metadata associated with information content, as well as metadata associated with one or more locations hosting the information content. For example, for a given analytics report, the "analytics metadata" may include metadata associated with the report itself (e.g., title, author, date of creation, report fields, report columns, linked information sources, and the like), as well as metadata associated with the database connection for the analytics report (e.g., metadata associated with a database, a database query and/or a data cube used for accessing or hosting the analytics report). Additionally, analytics metadata for one category of database connections (e.g., a database) may be associated (e.g., linked) to analytics metadata associated with another database connection category (e.g., a query and/or a cube), and/or to analytics metadata associated with information content that is accessible via the database connection. Furthermore, analytics metadata may include information for one or more attributes (or data) associated with a meta object model as well as the access path (e.g., location to a node, a database or another data location) for accessing data associated with the attribute.

As used herein, the term "model layer" refers to a software development layer where one or more software development frameworks are used to generate objects (or object models) (e.g., business objects or data models). The model layer objects can be associated with a plurality of software development framework types, where each type can include a plurality of framework-specific objects (or object models), each object model having a plurality of elements. One or more of the object models and object model elements may be accessed by an application in a consumption layer.

As used herein, the term "consumption layer" refers to a backend, where one or more data processing applications (or objects) that are independent of a software development framework, may reside. The data processing application may include an application developing framework, data access service, report-generating application, and so forth. Each consumption layer object may access one or more of the model layer objects using, for example, a user interface in accordance with the description herein.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step only when the first step must be completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following: "both A and B", "only A", "only B", "at least both A and B". As another example, "A or B" may mean at least the following: "only A", "only B", "both A and B", "at least both A and B". When an exclusive-or is intended, such will be specifically noted (e.g., "either A or B", "at most one of A and B").

In this document, various computer-implemented methods, processes and procedures are described. It is to be understood that the various actions (receiving, storing, sending, communicating, displaying, etc.) are performed by a hardware device, even if the action may be authorized, initiated or triggered by a user, or even if the hardware device is controlled by a computer program, software, firmware, etc. Further, it is to be understood that the hardware device is operating on data, even if the data may represent concepts or real-world objects, thus the explicit labeling as "data" as such is omitted. For example, when the hardware device is described as "storing a record", it is to be understood that the hardware device is storing data that represents the record.

Applications, framework types, object models, elements, user interfaces, and the like can be represented by a reference and/or an indications of the item can be received. For example, when receiving a data processing application, a reference (e.g., name, identifier, location or the like) to the application or other indication of it can be received. Such items and the references to them can be stored in one or more computer-readable media as described herein.

Figure 1:
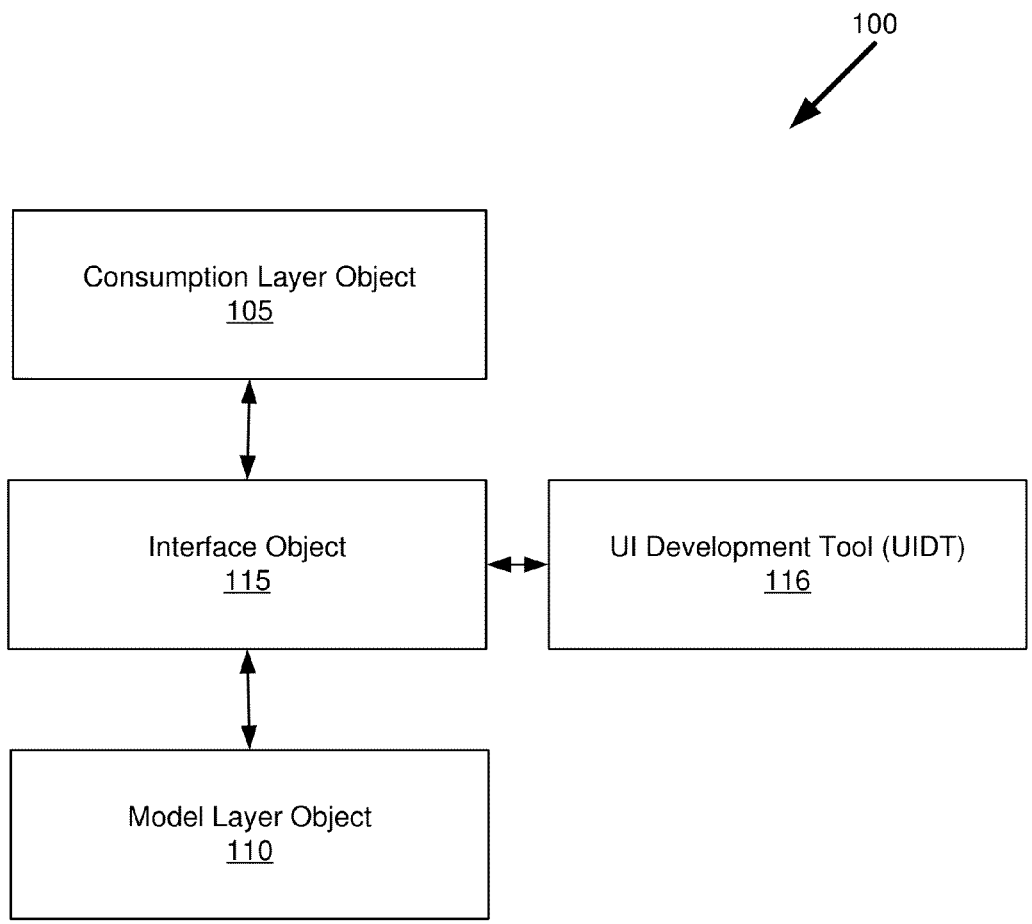
FIG. 1 is a block diagram of an interaction between objects using an interface object with a user interface development tool, in accordance with an example embodiment of the disclosure.

FIG. 1 is a block diagram of an interaction (100) between objects using an interface object with a user interface development tool, in accordance with an example embodiment of the disclosure. Referring to FIG. 1, the consumption layer object 105 may be any object configured to consume (e.g., read, write, update, etc.) data, such as a data processing application (an application developing framework, data access service, report-generating application, and so forth). More specifically, the consumption layer object 105 may be a data processing application, which may be independent of a software development framework associated with at least one model layer object 110.

The model layer object 110 may be a business object (e.g., as defined above) including, for example, a data model, functions, relationships and an associated business logic. The model layer object 110 may be implemented on a software development framework (e.g., Advanced Business Application Programming (ABAP)) as part of a model layer. In one or more example implementations, the model layer may include several additional frameworks, on which several model layer objects 110 are implemented. In this regard, since the consumption layer object 105 is a data processing application that is independent of a software development framework associated with at least one model layer object 110, developing consumption layer objects 105 may require special knowledge of and special skill for utilizing each of the several model layer objects 110.

In this regard, an interface object 115 may be configured to implement one or more model layer objects 110 in a common structure such that consumption layer objects 105 may utilize a single structure in order to interface with several model layer objects 110. In this regard, the interface object 115 may include a user interface development tool (UIDT) 116, which may be used to generate a user interface (UI) as a uniform structure for interfacing model layer objects 110 with at least one consumption layer object 105 (e.g., a data processing application or framework utilized by a developer of the consumption layer object 105). In other words, an object (e.g., a business object) associated with a model layer object 110 may be de-coupled from the framework used to implement the business object such that a developer of a consumption layer object 105 needs no special knowledge of and/or special skill in order to utilize the model layer object 110.

FIG. 2 is a block diagram of a business object data model (200), in accordance with an example embodiment of the disclosure. More specifically, FIG. 2 illustrates an Entity-Relationship Diagram of a business object. A notation for describing data models in relational database management systems is sometimes called Entity-Relationship Diagrams (ER-Diagrams). ER-Diagrams may be used to design database tables and their relationships. In several object-oriented programming languages, technologies exist that map these data models to class references or representations of the programming language sometimes called OR-Mapping. A business object (e.g., in object-oriented software development) describes objects of the business world including, for example, a data model, functions, relationships and an associated business logic.

As shown in FIG. 2 a business object data model 200 may be, for example, related to a sales object. The business object data model 200 may include at least one business object. For example, the business object data model 200 may include a business object 205 (e.g., sales order), a business object product 215 and a business object partner 220. A business object item 210 and the business object partner 220 may be nodes of the business object 205 (e.g., sales order). Further, the business object item 210 may also have an associated node (e.g., business object product 215). In the example of FIG. 2, the business object 205 may be a sales order object. However, other business objects are within the scope of this disclosure. The business object 205 may link to the business object partner 220 in order to, for example, indicate a business partner (e.g., customer) that has placed a sales order. The business object 205 may link to the business object item 210 (e.g., a sales order item) in order to indicate what is ordered. The business item 210 may indicate, for example, a Product ID, a quantity ordered (e.g., GrossAmount, NetAmount), and/or the like. The business object item 210 may link to the business object product 215. The business object product may indicate internal information about the ordered product (e.g., ID, Description, and/or the like).

In some systems the business objects (e.g., business object 205, business object item 210, and the like) may be elements of different systems (e.g., sales order management (SO) systems, product management systems, inventory management systems, enterprise resource planning (ERP) systems, and the like). Accordingly, business objects may be implemented on different frameworks or model layers (e.g., model layer 344 associated with model layer object 110). For example, the frameworks may include business object processing framework (BOPF), business object layer (BOL), service provider interface (SPI), or low level representations such as data dictionary (DDIC) tables/views, core data services, HANA views, and the like. Therefore, in order to integrate sales object 200, a developer may require special knowledge of and special skill for utilizing each of the frameworks or accessing these data models.

However, according to example embodiments, an interface object or framework or entity (e.g., interface object 115 and UIDT 116) may be used to de-couple the business object from the framework used to implement the business object using, for example, a UI developed by the UIDT 116 such that a developer needs no special knowledge of and/or special skill in order to utilize the business object and various elements associated with the business object (or another model layer object). In other words, the developer may only use a single user interface (e.g., UI generated by the UIDT 116) to interface a data processing application in a consumption layer with one or more business objects or frameworks associated with a model layer.

Figure 3:
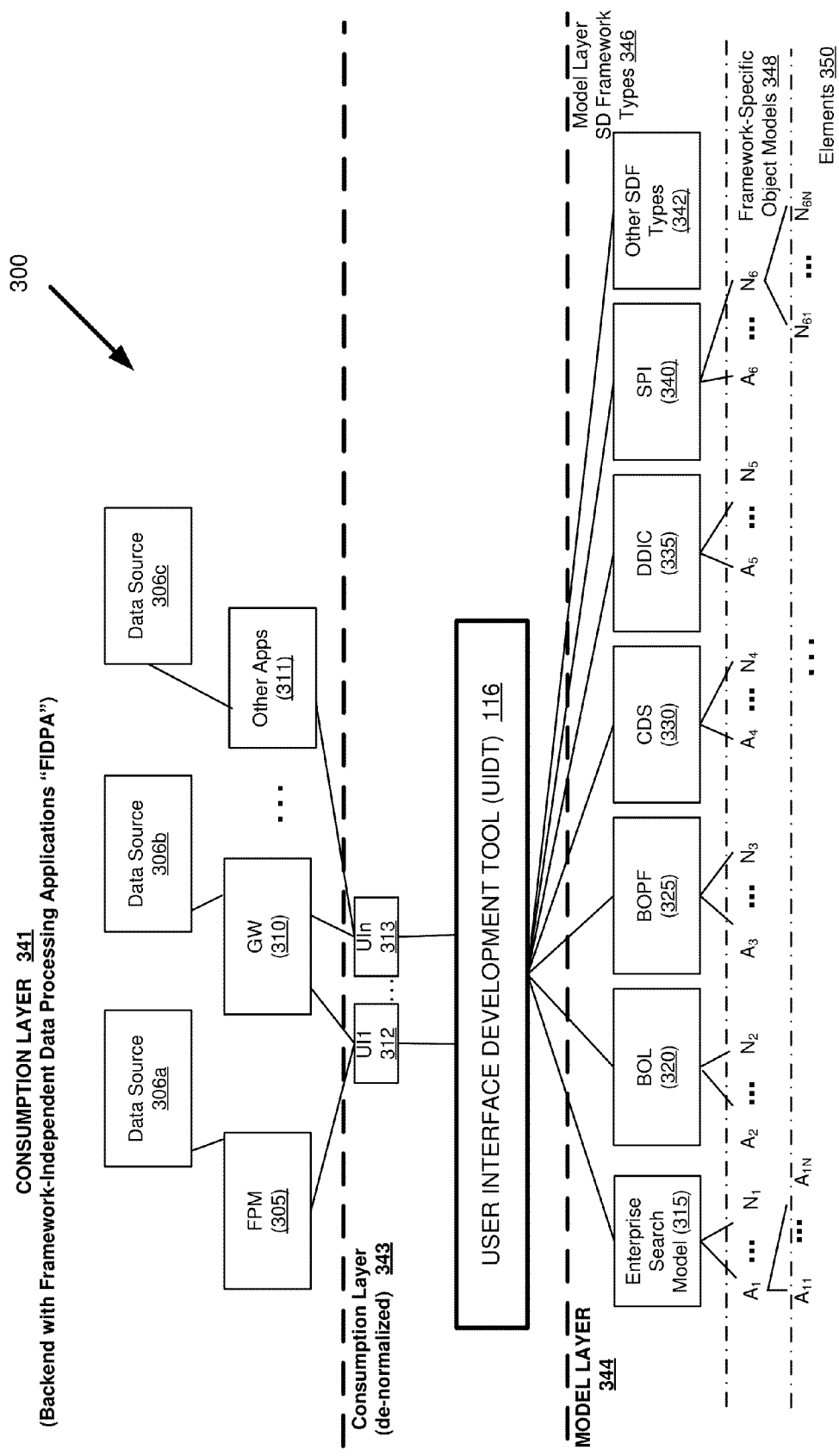
FIG. 3 is a block diagram of a user interface development tool (UIDT) interfacing between consumption layer objects and model layer frameworks, in accordance with an example embodiment of the disclosure.

FIG. 3 is a block diagram of a user interface development tool (UIDT) interfacing between consumption layer objects and model layer frameworks, in accordance with an example embodiment of the disclosure. Referring to FIG. 3, the data processing environment 300 may include a consumption layer 341 and a model layer 344.

The consumption layer 341 can include one or more data processing applications (or objects) 305, 310, . . . , 311, which applications are independent of a software development framework (e.g., independent of the model layer 344 and model layer objects). The data processing application may include an application developing framework, data access service, report-generating application, and so forth. For example, FPM 305 is a framework for developing self-service applications using Web Dynpro® for Java®. FPM 305 may be configured to ensure that self-service applications follow a consistent pattern or road map. GW 310 may be referred to as a "gateway application" and may include a set of add-ons configured to provide the ability to make an HTTP(S) request in order to access data (i.e., a data access application). Other applications 311 can also be included in the consumption layer 341. Each of the applications 305, 310, ..., 311 can use a data source 306a, 306b, and 306c, respectively.

The model layer 344 includes a plurality of software development framework types 346, where each type can include a plurality of framework-specific objects (or object models) 348, each object model having a plurality of elements 350.

In accordance with an example embodiment of the disclosure, the user interface development tool (UIDT) 116 may be used to generate one or more UIs (e.g., 312, ..., 313). The UIs 312, ..., 313 may be used at the consumption layer 341 (e.g., by a developer or user of the applications 305, 310, ..., 311) so that one or more of the object models (in sub-layer 348) and object model elements (in sub-layer 350) may be accessed by an application in the consumption layer 341. For example, the UIDT 116 may map one or more of the elements 350 to a data source of a corresponding application (e.g., data source 306a of application 305), allowing the application to access and process data in the data source 306a using one or more of the objects 348 in the model layer 344. In this regard, the model layer 344 is de-coupled from the consumption layer 341 via the UIs 312, ..., 313 within the de-normalized consumption layer 343.

The blocks associated with the model layer software development framework types 346 may include an enterprise search model 315, a business object layer (BOL) 320, a business object processing framework (BOPF) 325, core data services (CDS) 330, a data dictionary (DDIC) 335, a service provider infrastructure (SPI) 340, and other framework types 342.

The Enterprise Search Model 315 is an infrastructure supporting fast search and query operations on replicated data in Text Retrieval and information Extraction (TREX) (e.g., a search engine) or on original data in a High Performance Analytic Appliance (HANA) (e.g., an in-memory, column-oriented, relational database management system). The enterprise search model is an infrastructure configured to support fast search and query operations on replicated data. Enterprise search models are views on the data that can be connected with associations. Therefore, the Enterprise Search Model 315 can be described as a business object without the business logic. The associations may be used for navigation purposes on generic applications consuming these models.

The Business Object Layer (BOL) 320 is an abstraction layer for legacy code. BOL provides an infrastructure to build a business model on top of legacy code with a harmonized Application Programming Interface (API) configured to enable a model-based consumption in higher layers. The framework supports logical unit of work (LUW)/transactional handling, without input as to where the data is persisted.

The Business Object Processing Framework (BOPF) 325 is a framework configured to provide an end-to-end development experience. BOPF 325 supports the modeling of the data model and takes care of the persistency. BOPF 325 also enables the implementation of business logic as actions, determinations and validations, and may be configured to enable a consistent LUW handling (e.g., the span of time during which any database updates must be performed).

The core data services (CDS) 330 is a concept for HANA and ABAP on HANA in order to describe business objects as "first class citizens." CDS is configured to enable the definition of query languages native syntax (e.g., DDIC, HANA) to work with the business objects.

The data dictionary (DDIC) 335 is a native Advanced Business Application Programming (ABAP) component configured to define database tables and views. These tables and views can natively be handled in ABAP as first class citizens.

Persistence classes in object oriented (OO) ABAP provides classes that are representations of tables. The classes combine data models with business logic. ABAP persistence classes are a typical OR-Mapping infrastructure.

The Service Provider Interface (SPI) 340 is similar to BOL 320 but does not provide design time to model business objects. The SPI 340 may be defined via APIs. The other types 342 may include a Business Object Repository (BOR), which may be a registry for function modules. The BOR functions can be registered to enable a harmonized consumption.

Each of the model layer software development framework (SDF) types 346 (e.g., 315, ..., 342) may include corresponding object models A1, ..., N1 for the enterprise search model 315; A2, ..., N2 for the BOL 320; ...; and A6, ..., N6 for SPI 340. Each of the framework-specific object models 348 may include a plurality of elements 350. For example, object model A1 of the enterprise search model 315 may include elements A11, ..., A1n, and object model N6 of the SPI 340 may include elements N61, ..., N6n.

Figure 4:
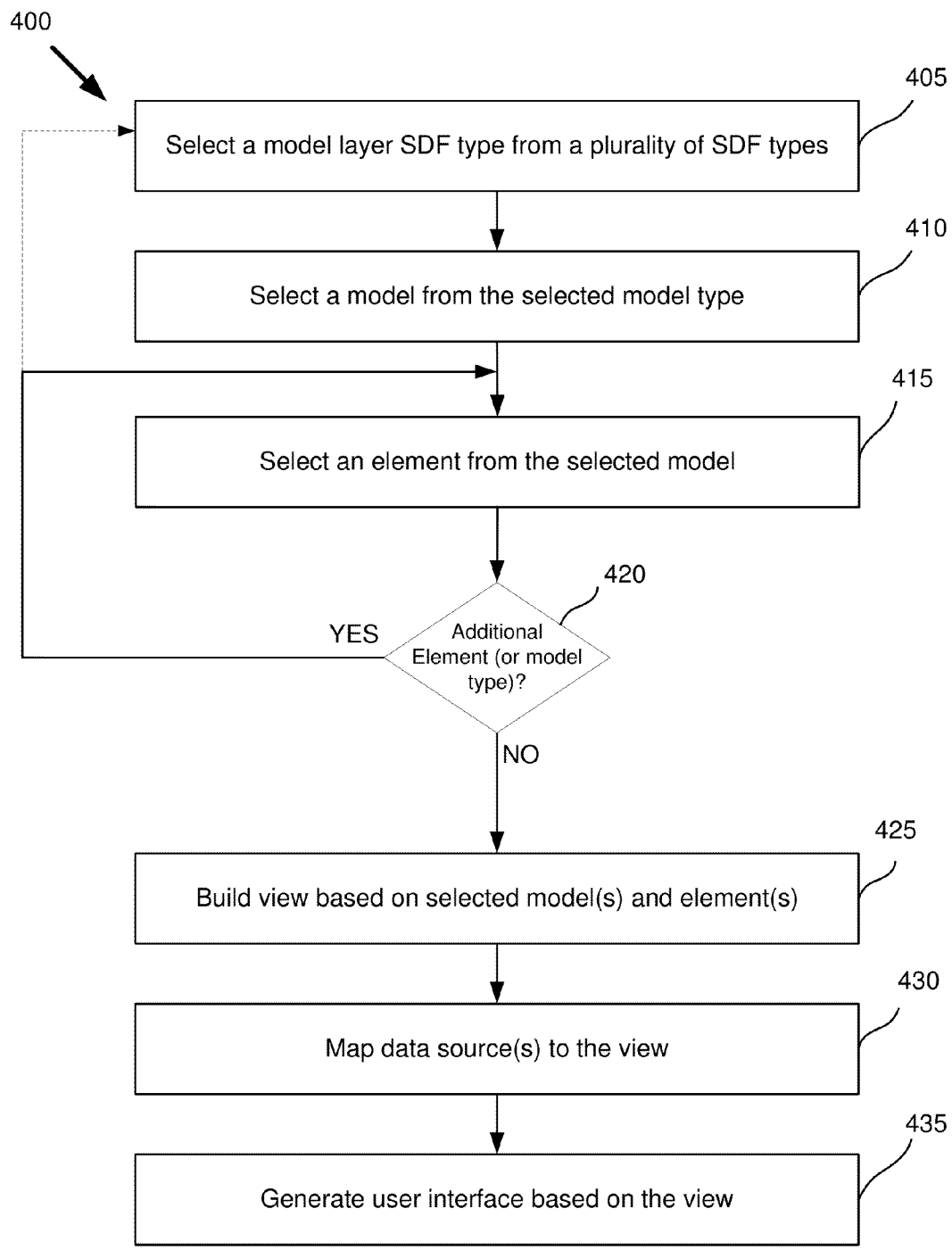
FIG. 4 is a flowchart of example method for generating a user interface (UI), in accordance with an example embodiment of the disclosure.

FIG. 4 is a flowchart of example method 400 for generating a user interface (UI), in accordance with an example embodiment of the disclosure. Referring to FIGS. 3-4, the example method 400 may start at 405 when a model layer SDF type may be selected from a plurality of SDF types. For example, the enterprise search engine 315 may be selected as a SDF type out of the plurality of SDF types 346 associated with the model layer 344. At 410, a model may be selected from the selected model type. For example, object model A1 (of the framework-specific object models 348) may be selected as an example model associated with the enterprise search model 315.

At 415, an element of the selected object model may be selected. For example, element A11 of the A1 object model may be selected (e.g., for inclusion in a UI generated by the UIDT 116). At 420, it may be determined whether an additional element or model type may be selected. If an additional element of the already selected SDF type (315) and object model (A1) is needed, then processing may resume at 415, when an additional element (e.g., A12) of the selected object model (A1). If additional elements but from another SDF type are needed, then processing may resume at 405 (indicated by dashed line in FIG. 4), when a new SDF type may be selected from the plurality of available types 346. In this regard, several iterations via the decision block 420 may be performed so that elements from one or more of the SDF types 346 are selected.

At 425, a view may be built (e.g., 714 in FIG. 7) based on the selected object model(s) and element(s). At 430, a data source may be mapped to the view. At 435, a UI may be generated based on the view. For example, the UIDT 116 may use the generated view as part of a UI 312, which may be used as an interface between one or more of the consumption layer applications (e.g., 305) to SDF types in the model layer 344. During the mapping operation 430, the data source 306a associated with application 305 (and/or a data source associated with the selected SDF type) may be mapped to the view. In this regard, when the view is included in the UI, the UI can provide an interface between the SDF type, the selected object model and the consumption layer application (e.g., 305) which may be built on top of the selected SDF type.

Figure 5:
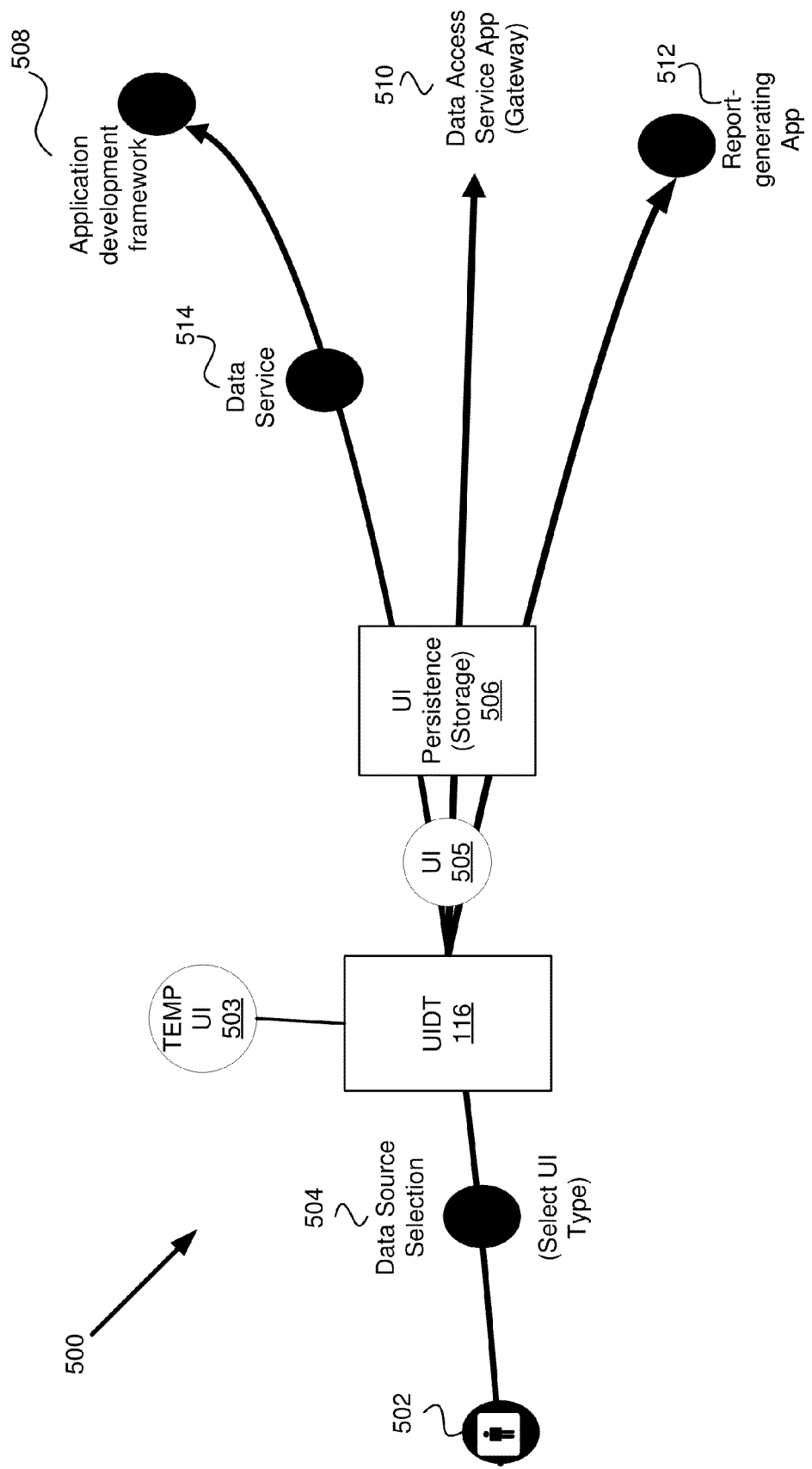
FIG. 5 is a block diagram of an example system for generating UIs using a user interface development tool (UIDT), in accordance with an example embodiment of the disclosure.

FIG. 5 is a block diagram of an example system 500 for generating UIs using a user interface development tool (UIDT), in accordance with an example embodiment of the disclosure. Referring to FIGS. 3-5, the system 500 may include the UIDT 116 and UI persistence 506. During an example UI development process, an administrator/developer 502 may initially perform a data source selection 504.

For example, the developer 502 may select one of the data sources 306a-306c associated with a consumption layer application, such as 508 (an application development framework, e.g., FPM 305), 510 (a data access service, e.g., gateway 310), a report-generating application 512, or another type of application (e.g., 311). The application development framework 508 may use Put another way, by virtue of selecting the data source, the developer 502 selects the UI type that will be generated by the UIDT 116.

The UIDT 116 may comprise suitable logic, circuitry, interfaces, and/or code and may be operable to generate one or more UIs, as explained in reference to FIGS. 3, 4, and 6-8. During an example UI generation (e.g., as explained in reference to FIGS. 4, 8, and 9), the UI design/generation process may be suspended and a temporary UI 503 may be generated. The UI design process may resume at a later time and a finished/complete UI 505 may be generated. After the UI 505 is generated, it may be persisted (stored) in UI persistence (storage) 506, and then it may be communicated to (or otherwise made accessible by) the corresponding application (508, 510, or 512) associated with the data source selection 504.

Figure 6:
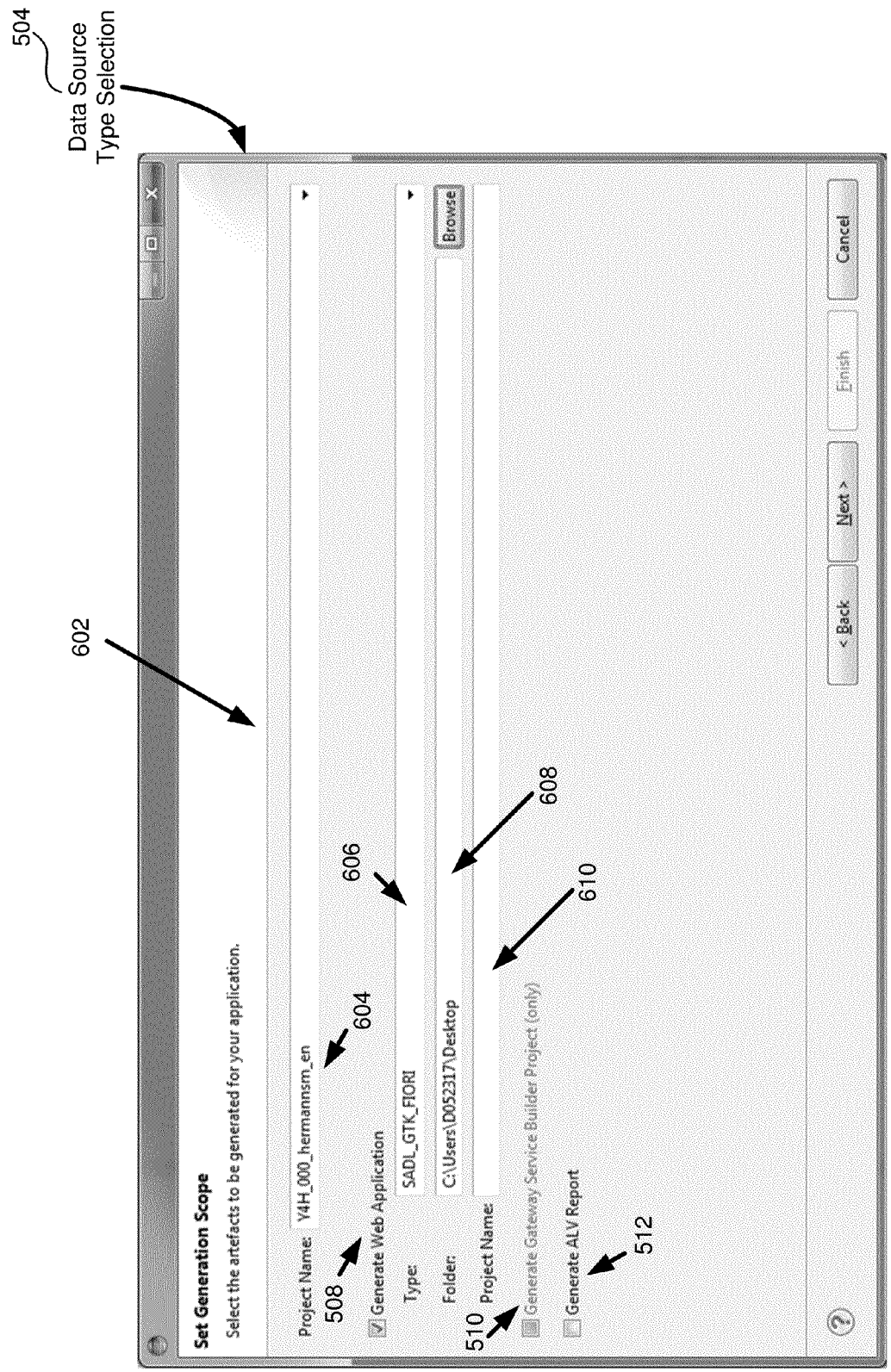
FIG. 6 is an example screenshot of a UI wizard for selecting a consumption layer software development framework-independent data processing application during UI generation, in accordance with an example embodiment of the disclosure.

FIG. 6 is an example screenshot of a UI wizard 602 for selecting a consumption layer software development framework-independent data processing application during UI generation, in accordance with an example embodiment of the disclosure. As shown herein, the user interface development tool can take the form of a wizard presenting fillable fields, drop down menus, and the like. So, a user interface following a selected software development framework type can be generated without coding. To simplify development across framework types, the information for generating the user interface can be collected by the tool, which supports the different framework types while presenting a unified development user interface across and generic to the different framework types.

Referring to FIG. 6, the UI wizard 602 illustrates the data source type selection 504 (as described in reference to FIG. 5). More specifically, the UI wizard 602 may include selection fields (e.g., checkboxes) for selecting one of the consumption layer applications 508, 510, and 512. As seen in FIG. 6, application 508 is selected (which is associated with generating a Web application). At 604, the UI generation may be given a project name. At 606, an application sub-type may be selected. In other words, the application 508 may be associated with one or more sub-types or dependent applications, and at 606 the sub-type application may be selected. At 608, a location of a folder may be designated where the folder may be storing the UI (e.g., the temporary UI 503 and/or the complete UI 505). An additional "project name" may be designated at 610, where the project name may be used for UI classification and archival storage.

Figure 7:
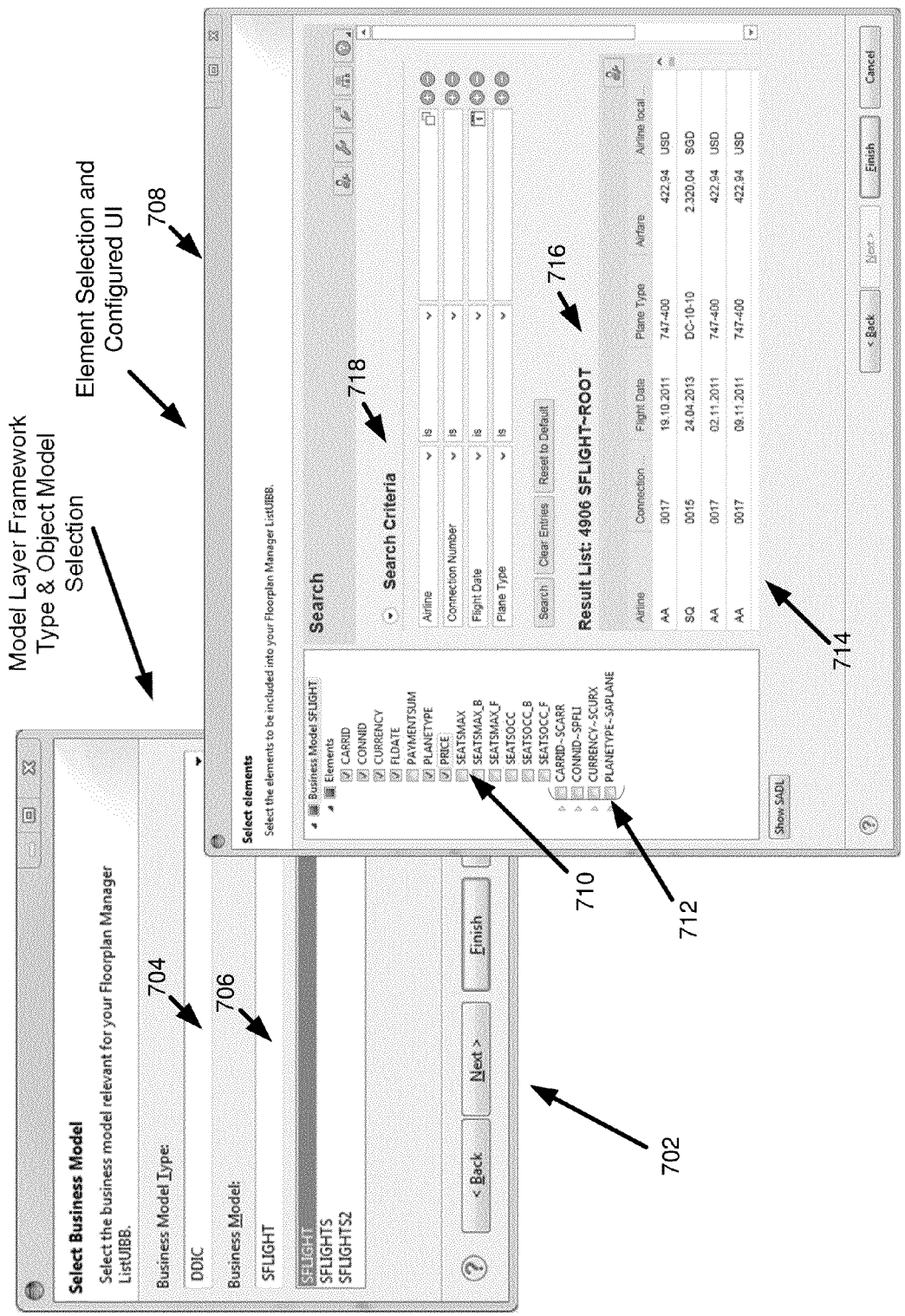
FIG. 7 illustrates example screenshot of UI wizards for selecting a model layer software development framework type, framework-specific object models and displaying UI preview during UI generation, in accordance with an example embodiment of the disclosure.

FIG. 7 illustrates example screenshot of UI wizards for selecting a model layer software development framework type, framework-specific object models and displaying UI preview during UI generation, in accordance with an example embodiment of the disclosure. Referring to FIGS. 3-5 and 7, there are illustrated UI wizards 702 and 708. The UI wizard 702 may be associated with the model layer SDF type (346) selection as well as the framework-specific object models (348) selection (e.g., steps 405 and 410 in FIG. 4). For example, a model layer SDF type may be selected at 704 (DDIC 335 is selected). At 706, a framework-specific object model (from the plurality of models 348 for DDIC 335, namely, object models A5, . . . , N5) may be selected (in FIG. 7, SFLIGHT is selected).

The UI wizard 708 may be associated with element selection 710 (e.g., steps 415-420 in FIG. 4) as well as display of the UI 716 that is being generated. More specifically, for the object model (e.g., SFLIGHT) selected at 706, a plurality of available elements (e.g., from elements 350) are displayed at 710 with corresponding selection interfaces (e.g., checkboxes). One or more of the elements 710 may be selected for inclusion in the UI, as the elements are selected, a current view 716 of the UI is displayed. As elements are selected (or de-selected), the UI wizard 708 updates the UI view 716 so that the selected elements appear. In an example embodiment, a search interface 718 may also be included as part of the final UI (i.e., a final UI 714 may include the UI view 716 with selected elements as well as the search interface 718 for performing a search based on one or more of the elements in the UI view 716). In the example, the elements comprise searchable field names (e.g., PLANETYPE and the like) that are reflected in the preview of the user interface.

In accordance with an example embodiment of the disclosure, the elements 350 may include metadata information associated with each element. Such metadata information may indicate, for example, one or more databases that may be used as data sources for the element, generated UIs that use the element, and one or more other elements (e.g., that belong to one or more other object models) that are considered associated with (related to) the current element. Such metadata information about element associations may be entered by a developer or it may be generated based on previously generated UIs that use the current element (e.g., in this instance, the current element may be deemed associated with one or more of the other elements in the UI). Referring to FIG. 7, the UI wizard 708 may also display a list of elements 712, which can be "related" (or associated) elements from another object model. In this regard, the UI 714 may include a UI view 716 with elements from the currently selected object model as well as from one or more other object models.

Figure 8:
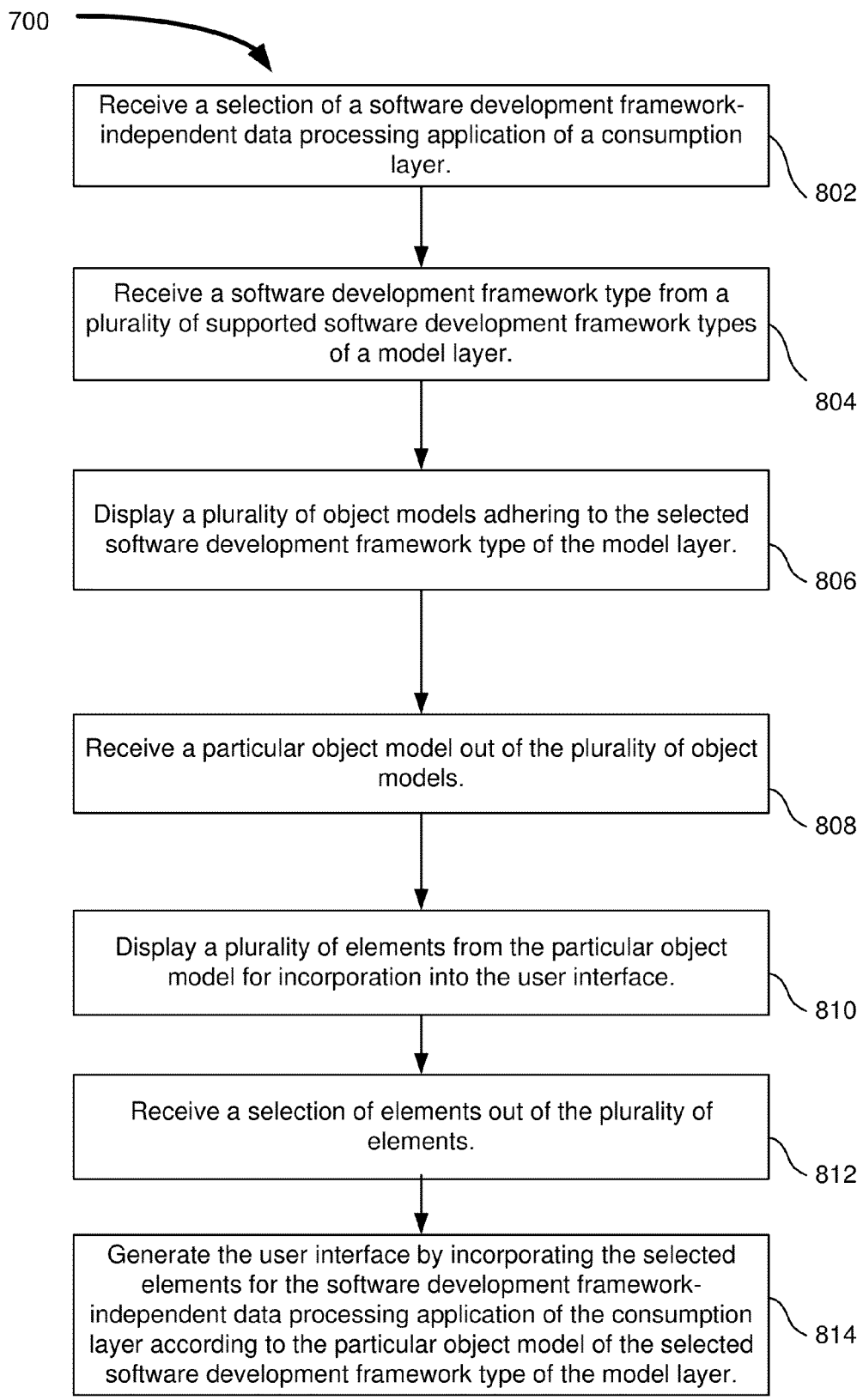
FIGS. 8-9 are flowcharts of example methods for developing a user interface (UI), in accordance with an example embodiment of the disclosure.
Figure 9:
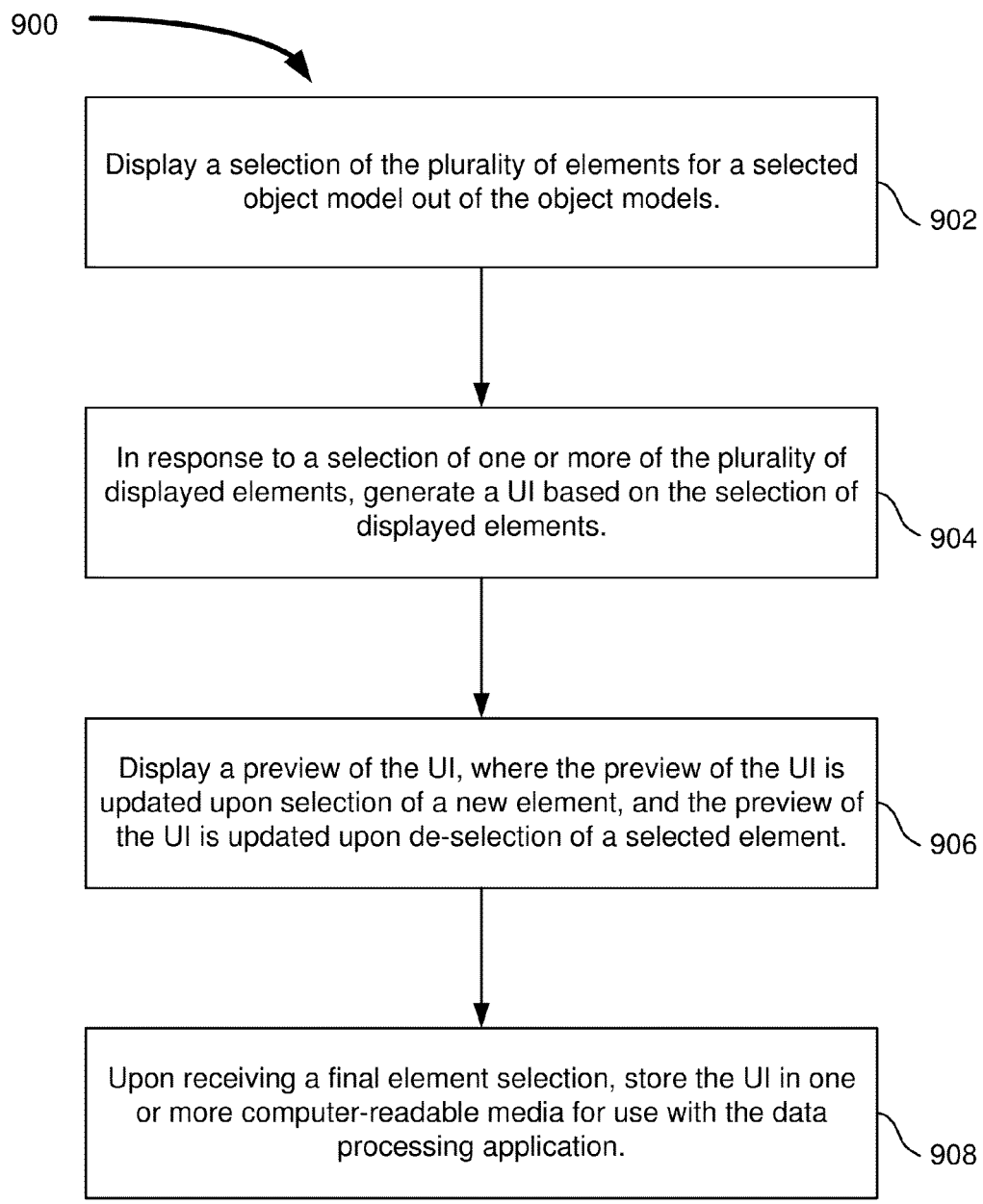

FIGS. 8-9 are flowcharts of example methods for developing a user interface (UI), in accordance with an example embodiment of the disclosure. Such methods can be implemented via a user interface development tool as described herein. Referring to FIGS. 3-8, the example method 800 may start at 802, when a selection of a software development framework-independent data processing application of a consumption layer may be received. For example, the UIDT 116 may receive a selection of one of the applications 305, 310, . . . , 311 from the consumption layer 341. At 804, a selection of a software development framework type may be received from a plurality of supported software development framework types of a model layer. For example, the UIDT 116 may receive a selection of a SDF type out of the model layer SDF types 346 in the model layer 344 (e.g., step 405).

At 806, a plurality of object models adhering to the selected software development framework type of the model layer may be displayed. For example, if DDIC 335 is selected (at 704) as the framework type, a plurality of object models associated with DDIC 335 may be displayed for selection (e.g., at 706). At 808, the UIDT 116 may receive a selection of a particular object model out of the plurality of object models (e.g., object model SFLIGHT may be selected at 706) (e.g., step 410 in FIG. 4). At 810, a plurality of elements from the particular object model may be displayed for incorporation into the user interface. For example, a plurality of elements 710 may be displayed by the UI wizard 708, for selection and inclusion in the UI 714. At 812, the UIDT 116 may receive a selection of elements out of the plurality of elements. For example, some of the elements 710 may be selected (as seen in FIG. 7) for inclusion in the UI 714. As described herein, a preview of the user interface can be displayed for consideration.

At 814, the UIDT 116 may generate the user interface (e.g., 505 or 714), where the generating includes incorporating the selected elements for the software development framework-independent data processing application of the consumption layer according to the particular object model of the selected software development framework type of the model layer.

Referring to FIGS. 3-7 and 9, the example method 900 may start at 902, when a selection of the plurality of elements for a selected object model out of a plurality of object models may be displayed. For example, the UIDT 116 may use the UI wizards 702 and 708 to display elements 710 for a selected object model (e.g., SFLIGHT selected at 706) for a selected model layer SDF type (e.g., DDIC 335 selected at 704). At 904, in response to a selection of one or more of the plurality of displayed elements (710), the UIDT 116 may generate a UI based on the selection of displayed elements. For example, the UI 714 includes the selected elements in view 716 so that it couples the selected data processing application (e.g., 508, 606) to the selected object model (e.g., DDIC 335).

The UI specific framework artifacts are generated by the wizard such that they bind the chosen elements of the interface objects. When the Ui is active, at runtime, the access methods exposed by the interface object are called. They, in turn, work with the data access mechanisms at the level of the business objects or models. These can be exposed by an own framework, such as BOL or BOPF, or can be direct database access in the case of DDIC or CDS artifacts.

The UI 714 may also include a search interface 718 associated with the selection of the plurality of elements. At 906, the UIDT 116 (via the UI wizard 708) may display a preview (716) of the UI, where the preview of the UI is updated upon selection of a new element or upon de-selection of a selected element. At 908, upon receiving a final element selection, the UIDT 116 may store the UI in one or more computer-readable media for use with the data processing application. For example, the UIDT 116 may store the generated UI 505 in UI persistence 506 for subsequent use by one or more applications in the consumption layer 341.

Figure 10:
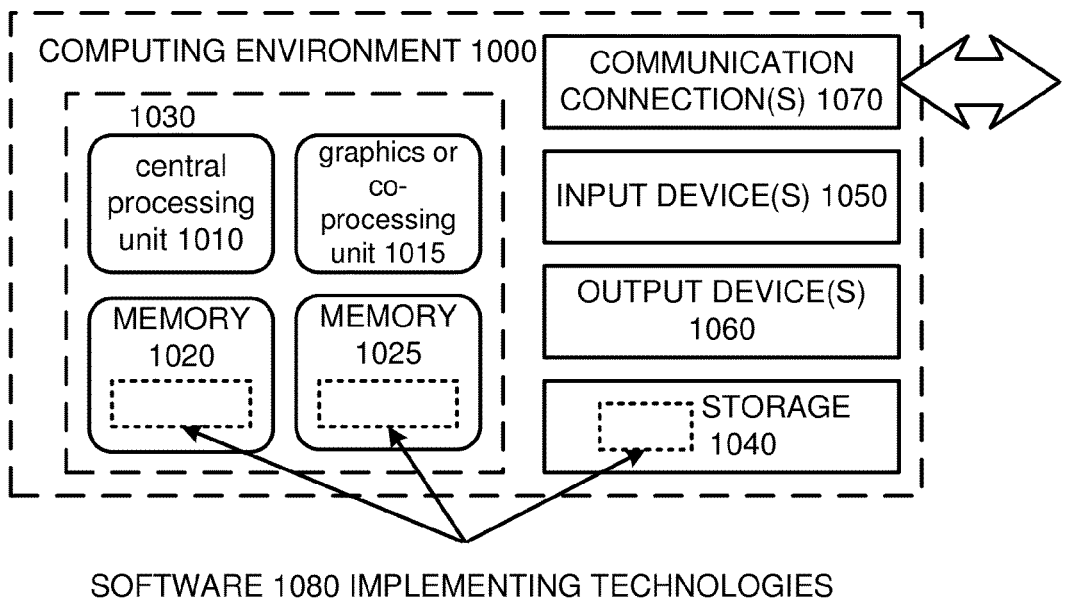
FIG. 10 is a diagram of an example computing system, in which described embodiments can be implemented.

FIG. 10 is a diagram of an example computing system, in which described embodiments can be implemented. The computing system 1000 is not intended to suggest any limitation as to scope of use or functionality, as the innovations may be implemented in diverse general-purpose or special-purpose computing systems. With reference to FIG. 10, the computing system 1000 includes one or more processing units 1010, 1015 and memory 1020, 1025 (e.g., coupled to the processing units). In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), nonvolatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 11:
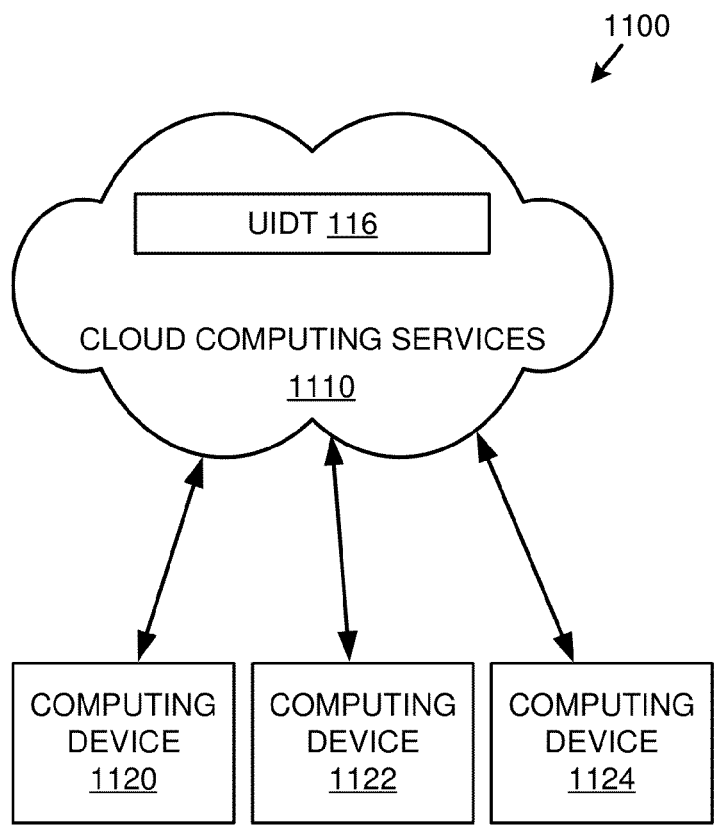
FIG. 11 is an example cloud computing environment that can be used in conjunction with the technologies described herein.

FIG. 11 is an example cloud computing environment 1100 that can be used in conjunction with the technologies described herein. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries). Additionally, the cloud computing service 1110 may implement the UIDT 116 and other functionalities described herein relating to generating UIs based on model layer objects and elements.

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., non-transitory computer-readable media, such as one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include communication connections (e.g., 1070) such as modulated data signals or carrier waves.

Any of the computer-executable instructions for implementing the disclosed techniques as well as any data created and used during implementation of the disclosed embodiments can be stored on one or more computer-readable storage media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As utilized herein the terms "circuits" and "circuitry" refer to physical electronic components (i.e. hardware) and any software and/or firmware ("code") which may configure the hardware, be executed by the hardware, and or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "e.g.," introduces a list of one or more non-limiting examples, instances, or illustrations. As utilized herein, the term "processor" may be used to refer to one or more of a central processing unit, a processor of a symmetric or asymmetric multiprocessor system, a digital signal processor, a micro-controller, a graphics/video processor, or another type of processor.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

We claim:

1. A computer-implemented method of developing a user interface, the method comprising:
receiving a software development framework-independent data processing application of a consumption layer;
from a plurality of supported software development framework types of a model layer, receiving a software development framework type;
displaying a plurality of object models adhering to the selected software development framework type of the model layer;
receiving a particular object model out of the plurality of object models;
displaying a plurality of elements from the particular object model for incorporation into the user interface;
receiving a selection of elements out of the plurality of elements; and
generating the user interface, wherein the generating comprises incorporating the selected elements for the software development framework-independent data processing application of the consumption layer according to the particular object model of the selected software development framework type of the model layer.

2. The method of claim 1, wherein:
information for generating the user interface is collected via a user-interface development tool supporting the plurality of software development framework types while presenting a unified development user interface across and generic to the plurality of software development framework types.

3. The method of claim 1, wherein the generating comprises:
coupling the data processing application to the particular object model, whereby the selected model layer software development framework type is automatically implemented for the data processing application.

4. The method of claim 1, further comprising:
displaying a plurality of data processing application genres comprising a web application, a report, and a data service;
receiving a selected data processing application genre out of the displayed genres;
displaying a plurality of data processing applications of the selected genre;
receiving a selected data processing application out of the displayed applications; and
using the selected data processing application as the data consumption layer software development framework-independent data processing application.

5. The method of claim 1, wherein the supported software development framework types comprise:
an enterprise search model;
a business object layer;
a data dictionary;
core data services;
a service provide infrastructure; and
a business object processing framework.

6. The method of claim 1, further comprising:
iterating though a plurality of the software development framework types;
whereby a user interface supported by the plurality of the software development framework types is generated.

7. The method of claim 1, further comprising:
for a set of elements outside the particular object model, determining the set of elements as being co-relevant to the particular object model based on a comparison of metadata associated with each element; and
displaying the set of elements as available for incorporation into the user interface.

8. The method of claim 1 wherein:
information for generating the user interface is received via a wizard presenting fillable fields and drop down menus;
whereby a user interface following the selected model layer software development framework type is generated without coding.

9. The method of claim 1, further comprising:
presenting a preview of the user interface; and
updating the preview upon a selection of a new element.

10. The method of claim 9, wherein:
the user interface preview comprises both a search criteria pane and a result list pane supported by a backend incorporating the selected elements.

11. The method of claim 1 further comprising:
receiving business entity-specific metadata; and
integrating the business entity-specific metadata into the user interface.

12. A user interface (UI) configurator system, comprising:
an interface processor; and
a memory coupled to the interface processor, the memory configured to store:
a plurality of framework-specific object models, each object model comprising a plurality of elements for selection in a user interface; and
a framework-independent data processing application associated with a data source;
the interface processor operable to couple the framework-independent data processing application with the plurality of framework-specific object models, the plurality of object models comprising at least a database dictionary model and a search model, the interface processor is further configured to:
display a selection of the plurality of elements for a selected object model out of the object models;
in response to a selection of one or more of the plurality of displayed elements, generate a UI based on the selection of displayed elements, wherein the UI couples the data processing application to the selected object model and the UI comprises a search interface associated with the selection of the plurality of elements;
display a preview of the UI, wherein the preview of the UI is updated upon selection of a new element, and the preview of the UI is updated upon de-selection of a selected element; and
upon receiving a final element selection, store the UI in one or more computer-readable media for use with the data processing application.

13. The UI configuration system of claim 12, wherein:
the selected object model comprises an enterprise search model; and
search criteria for the user interface are based on search criteria associated with the search model.

14. The UI configuration system of claim 12, wherein the interface processor is further configured to:
select the data processing application from a plurality of applications based on a selection input.

15. The UI configuration system of claim 14, wherein:
the plurality of applications comprise at least one of an application framework for developing a self-service application, a data access application, or a report-generating application.

16. The UI configuration system of claim 12, wherein:
the plurality of object models comprises an object for processing legacy code and for building a new object based on the legacy code.

17. The UI configuration system of claim 12, wherein:
the search model supports search and query operations on replicated data within an in-memory, column-oriented database management system.

18. The UI configuration system of claim 12, wherein the interface processor is further configured to:
map the data source associated with the data processing application to the selection of displayed elements in the UI.

19. The UI configuration system of claim 12, wherein the interface processor is further configured to:
upon receiving the final element selection, associating a final version of the UI with the data processing application so that the final version of the UI can be accessed from the data processing application.

20. One or more computer-readable storage media comprising computer-executable instructions causing a computing system to perform a method for generating a user interface (UI) for a software development framework-independent data processing application of a consumption layer, the method comprising:
via a user interface wizard presenting a unified user interface generic to a plurality of software development framework types, receiving an indication of the software development framework-independent data processing application;
from a plurality of supported software development framework types of a model layer, receiving a software development framework type;
displaying a plurality of object models adhering to the selected software development framework type of the model layer;
receiving a particular object model out of the object models as desired to be implemented for the data processing application;
displaying a plurality of elements from the particular object model for incorporation into the user interface;
displaying a set of additional elements outside the particular object model, the set of elements being co-relevant to the particular object model based on a comparison of metadata associated with each element in the set;
displaying the set of additional elements as available for incorporation into the user interface;
receiving a selection of selected elements out of the plurality of elements and the set of additional elements, wherein the elements comprise searchable field names;
generating a preview of the user interface, wherein the preview incorporates a search user interface showing search criteria incorporating one or more of the selected elements and results of searching the search criteria; and
generating the user interface for the data processing application, wherein the generating comprises incorporating the selected elements for the data processing application according to the particular object model of the selected software development framework type, thereby de-coupling the data processing application of the consumption layer from the particular object model of the model layer.

* * * * *